United States Patent Office 3,428,709
Patented Feb. 18, 1969

3,428,709
POLYMERS OF N-PERFLUOROALKANOYLAMINO-
AND N-PERFLUOROALKANOYLAMINOALKYL
ACRYLAMIDES AND METHACRYLAMIDES
Eduard K. Kleiner, New York, N.Y., assignor to Geigy
Chemical Corporation, Ardsley, N.Y., a corporation
of Delaware
No Drawing. Filed Aug. 22, 1966, Ser. No. 573,839
U.S. Cl. 260—836                                   21 Claims
Int. Cl. D06m 15/36; C08g 45/04

ABSTRACT OF THE DISCLOSURE

Polymers of compounds represented by the formula:

$$C_nF_{2n+1}-\underset{\underset{O}{\|}}{C}-\underset{\underset{R_1}{|}}{N}-A-\underset{\underset{R_2}{|}}{N}-\underset{\underset{O}{\|}}{C}-\underset{\underset{R_3}{|}}{C}=CH_2$$

wherein $n$ is a whole number of from 1 to 18, A is
—$(CH_2)_m$—, $m$ being from 0 to 4, $R_1$ and $R_2$, independently, are each hydrogen or alkyl of from 1 to 6 carbon atoms; or when taken together, $R_1$ and $R_2$ are

—$CH_2CH_2$— when A is —$CH_2CH_2$—, and $R_3$ is hydrogen or methyl, are useful in providing oil- and water-repellent finishes especially for textiles as well as various other substrates.

---

This invention relates to polymers of fluorine-containing monomers with useful soil repellent properties. More particularly it relates to homopolymers and copolymers of N - perfluoroalkanoylamino- and N - perfluoroalkanoylaminoalkylacrylamides and methacrylamides. The new polymers provide oil- and water-repellent finishes useful to treat materials such as textiles, paper, leather, painted wooden and metallic surfaces, and the like.

The perfluorinated polymers contemplated by the instant invention are those made by polymerizing compounds of Formula I:

$$C_nF_{2n+1}-\underset{\underset{O}{\|}}{C}-\underset{\underset{R_1}{|}}{N}-A-\underset{\underset{R_2}{|}}{N}-\underset{\underset{O}{\|}}{C}-\underset{\underset{R_3}{|}}{C}=CH_2 \qquad (I)$$

wherein $n$ is a whole number of from 1 to 18, A is —$(CH_2)_m$—, $m$ being from 0 to 4, $R_1$ and $R_2$, independently, are each hydrogen or alkyl of from 1 to 6 carbon atoms; or when taken together, $R_1$ and $R_2$ are

—$CH_2CH_2$— when A is —$CH_2CH_2$—, and $R_3$ is hydrogen or methyl. The $C_nF_{2n+1}$ radical may be straight or branched chain. Where used herein, "acrylamide" contemplates as well "methacrylamide." The term "polymers" includes homopolymers and copolymers.

Special mention is made of an especially valuable embodiment of this invention. This comprises polymers of compounds of the formula above wherein $n$ is a whole number of from 1 to 18, preferably from 7 to 15, and R and $R_1$ are hydrogen or methyl.

Especially useful as embodiments of this invention are polymers of the compounds, N-perfluorooctanoyl-N'-methacryloylhydrazine, a compound of the above formula in which the straight chain $C_nF_{2n+1}$ radical has a value for $n$ of 7, $m$ is 0, $R_1$ and $R_2$ are hydrogen and $R_3$ is methyl; N - perfluorooctanoyl-N'-methacryloylpiperazine, a compound of the above formula wherein $n$ is 7, $m$ is 2, $R_1$ and $R_2$, taken together, and A are —$CH_2CH_2$— and $R_3$ is methyl; N-perfluorooctanoyl-N'-acryloylhydrazine, a compound of the above formula wherein $n$ is 7, $m$ is 0, and $R_1$, $R_2$ and $R_3$ are hydrogen; N-perfluorooctanoyl-N'-methyl-N'-acryloylhydrazine; a compound of the above formula wherein $n$ is 7, $m$ is 0, $R_1$ and $R_3$ are hydrogen and $R_2$ is methyl; and N-perfluorooctanoyl-N,N'-dimethyl-N'-methacryloylhydrazine, a compound of the above formula wherein $n$ is 7, $m$ is 0 and $R_1$, $R_2$ and $R_3$ are methyl.

The new polymers are characterized by excellent resistance to hydrolysis. This provides substantial advantage in their use as fabric finishes, when compared to finishes previously used for the purpose of soil repellency. Fabrics finished with polymers made from the instant monomer retain their soil-repellent properties after repeated washings. They are especially useful where soil redeposition is a problem. They have, in addition, markedly superior light-fastness and color fastness. They are resistant to removal in dry cleaning operations.

Also contemplated are copolymers of compounds of Formula I above with comonomers which contain an ethylenic linkage. The N-perfluoroalkanoylamino- and N-perfluoroalkanoylaminoalkyl-acrylamides and methacrylamides form copolymers with many comonomers. Illustrative of the said comonomers which contain an ethylenic linkage are ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, alpha-chloroacrylic acid and alkyl esters thereof, methacrylonitrile, vinyl carbazole, vinyl pyrrolidone, vinyl pyridine, vinyl alkyl ethers, vinyl alkyl ketones, butadiene, fluorinated butadienes, chloroprene, fluoroprene, isoprene, and the like. Especially useful to form soil-repellent finishes are copolymers of N-perfluorooctanoyl-N'-methacryloylhydrazine and esters of acrylic and methacrylic acids derived from alcohols containing from about 1 to about 16 carbon atoms, such as lauryl methacrylate, octyl methacrylate, hexyl acrylate, ethyl acrylate, 2-ethylhexyl acrylate, and the like.

Since these novel fluoropolymers and copolymers find substantial use as textile finishes, it is an advantage to include in the monomer mixture from about 0.2 to about 5% by weight of a reactive acrylic, which permits cross-linking either by heat or crosslinking agents. Such reactive fluorocopolymers give textile finishes with superior resistance to washing, dry cleaning, scrubbing, abrasion and crushing, both wet and dry, and also a better durability of the oil and water repellency.

Illustrative of such reactive comonomers are those derivatives of acrylic or methacrylic acid exhibiting a moiety which, as a pendant group on the resultant interpolymer, is capable of reacting with another compound so as to effect crosslinking. Such groups are well known and may be hydroxy as in the case of a hydroxyalkyl acrylate, carboxy as in the case of acrylic or methacrylic acid, epoxy as in the case of glycidyl methacrylate, methylolamido as in the case of N-methylolacrylamide or alkoxymethylamido as in the case of an etherified methylolacrylamide. Also useful are acrylamide and methacrylamide.

This invention also contemplates in one of its embodiments polymers having a skeletal chain consisting essentially of repeating units represented by the formula:

$$C_nF_{2n+1}-\underset{\underset{O}{\|}}{C}-\underset{\underset{R_1}{|}}{N}-A-\underset{\underset{R_2}{|}}{N}-\underset{\underset{O}{\|}}{C}-\underset{\underset{CH_2}{|}}{C}-R_3$$

wherein $n$, A, $R_1$, $R_2$ and $R_3$ are as defined above.

The perfluorinated compounds useful to prepare the new compounds can be made from readily available materials according to the reaction outlined in the following sequence:

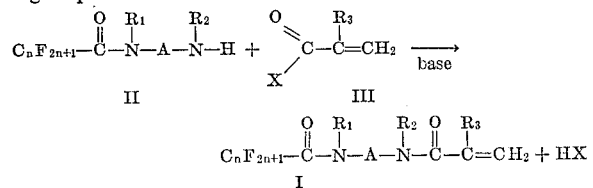

wherein $n$, $A$, $R_1$, $R_2$ and $R_3$ are as above defined and $X$ is halogen, preferably chlorine or bromine. The term "base" contemplates a reagent which promotes condensation by binding the elements of hydrogen halide eliminated as a byproduct. Pyridine, quinoline and triethylamine are especially useful bases.

The starting materials are readily available or can be prepared by techniques readily within the capabilities of those skilled in the art. N-aminoalkyl perfluoroalkylamides of Formula II can be prepared, for example, by treating an appropriate alkyl perfluoroalkylcarboxylate with a hydrazine derivative or a diamino derivative according to the following sequence:

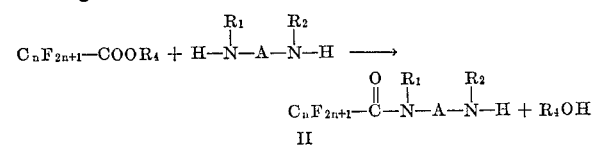

wherein $R_4$ is alkyl and $n$, $A$, $R_1$ and $R_2$ are as hereinabove defined. The reaction is carried out simply by mixing the ester with a molar equivalent of more of the diamino derivative. The use of an excess of the diamino derivative has a tendency to reduce the amount of diamide formed. It is desirable for best yields to employ an inert solvent, such as lower alkanol, like methanol, and to keep the reaction temperature at about 30° C. until the condensation is substantially complete. The starting material is recovered by adding enough water to cause its precipitation or by distilling off the solvent, if one is used, in a vacuum. Then, if desired, purification is effected by recrystallization from a mixture of lower alcohol and water (1:1), or if the compound is a liquid, by distillation under reduced pressure.

Of course, as will be obvious to those skilled in the art, an alternative procedure is necessary to prepare compounds of Formula I, which would be derived from starting materials of Formula II wherein $A$ is $-CH_2-$ and $R_1$ is as defined above, and $R_2$ is hydrogen. This is for the reason that the said Formula II compound is difficult to obtain because the compound $$H_2N-CH_2-NH_2$$

is not stable enough to be isolated and used as an intermediate. One useful alternative procedure is to treat a perfluoroalkanoylamide with formaldehyde to prepare a N-methylol perfluoroalkanoylamide of Formula IV.

and then to convert this to the desired product of Formula I by reaction with an appropriately substituted acrylonitrile or acrylamide and sulfuric acid, according to the following pathway:

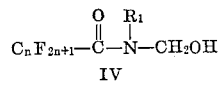

wherein $Y$ is $CN$ or $CONH_2$ and $R_1$ and $R_3$ are as defined above.

The acrylyl and methacrylyl halides of Formula III, used as starting materials, are items of commerce or can be readily prepared by treating the free acid with a slight molar excess of halogenating agent such as phosphorus tribromide, phosphorus pentachloride, and the like. The reaction mixture is allowed to stand, usually at about 25° C., until the reaction is substantially complete, then the residue is purified by recrystallization or distillation to afford the starting material of Formula III.

One convenient procedure to prepare the instant monomers is by adding the compound of Formula III to a stirred mixture of an equimolar amount of the appropriate compound of Formula II and pyridine in about one-half volume of acetonitrile, based on the reaction volume. The reaction temperature preferably is maintained at below about 30° C. Depending on the nature of the starting materials, the reaction is usually complete in about 1 hour. The product can be recovered, for example, by adding several volumes of water and then extracting it into ether, and separating the ether, the product remaining as a residue after evaporation of the ether. The product can be purified, for example, by distillation, preferably in a vacuum or by recrystallization from a solvent such as carbon tetrachloride. Polymerization during distillation can be inhibited by adding a small amount of hydroquinone.

The instant homopolymers and copolymers are formed by standard procedures well known to those skilled in the art. Polymerization occurs readily by bulk, solution or emulsion techniques, employing free radical-forming catalysts. The ratios of percentages by weight of the respective monomers used can vary widely in the formation of useful copolymers. For example, charge ratios of the N-perfluoroalkanoylamino- and perfluoroalkanoylaminoalkyl acrylamide- and -methacrylamide monomers may vary from 1 to 99% by weight of the total monomer mixture. It is preferred however, for the best balance of economy and ultimate properties, to use between about 40 and about 90% by weight of the instant monomers based on the total monomer mixture.

The copolymers broadly contemplated can have at least three structural variations: they can be homogeneous copolymers; or they can exist in the form of segmented (or heterogeneous) copolymers; or they can comprise physical blends of N-perfluoroalkanoyl-N-perfluoroalkanoylaminoalkyl-acrylamide or -methacrylamine homopolymers or copolymers blended with a non-fluorine containing homo- or co-polymer. The term "copolymer" used herein broadly contemplates these above-mentioned variations, as well as all copolymers of the said -acrylamides or -methacrylamides obvious to those skilled in the art. Exemplification for the preparation of homogeneous copolymers is given hereinafter. Suitable techniques applicable to the preparation of segmented or heterogeneous copolymers within the scope of this invention are exemplified in U.S. 3,068,187. The preparation of copolymer blends within the scope of this invention can be achieved employing appropriate monomers and the detailed descriptions in Belgian Patents Nos. 635,437 and 645,697. In some instances copolymers with superior repellencies are obtained as the result of application of the latter two techniques.

In general all polymerization techniques and procedures as to kind and amount of catalyst, emulsifiers, chain regulators, solvents, and the like are well within the capabilities of those skilled in the art to which this invention pertains.

Films of the homopolymers and copolymers can be prepared either by casting from solvent solutions or from aqueous emulsions. Especially useful as solvents are fluorinated liquids, and special mention is made of α,α,α-trifluorotoluene, also known as benzotrifluoride, hexafluoroxylene and mixtures of these with ethyl acetate or acetone and the like.

It is also uniquely advantageous, especially in the preparation of fabric finishes, to use blends of the instant homopolymers with other homopolymers such as polyalkyl acrylates and polyalkyl methacrylates, illustrative of which is poly n-octyl methacrylate. Since the instant homopolymers of certain of N-perfluoroalkanoylamino- and N - perfluoroalkanoylaminoalkyl - acrylates and -methacrylates have a tendency to be brittle and high melting, blending them with, for example, from about 20 to about 97% by weight of a homopolymer such as poly-n-octyl methacrylate provides useful compositions which, surprisingly, retain high repellency ratings even though the relative amount of polymer of the instant monomers is quite low.

The following procedures are illustrative of the preparation of compounds useful to prepare the polymers of this invention:

PROCEDURE A

N-perfluorooctanoyl-N'-methacryloylhydrazine (a) Perfluorooctanoylhydrazide.—To a solution of 5.0 parts of 99% hydrazine hydrate in 10 parts by volume of methanol is added dropwise with stirring 21.4 parts of methyl perfluorooctanoate. The temperature of the reaction mixture is not allowed to exceed 30° C. After the addition is complete the product is crystallized by the addition of water. After filtration, washing with methanol-water (1:1) and drying, the product, perfluorooctanoyl-hydrazide weighs 12.8 parts and melts at 100.2° C.

Analysis.—Calc'd for $C_8H_3F_{15}N_2O$: C, 22.44; H, 0.70. Found: C, 22.29; H, 0.81.

(b) N - perfluorooctanoyl-N'-methacryloylhydrazine.— To a solution of 12.75 parts of perfluorooctanoylhydrazide and 2.4 parts of pyridine in 10 parts by volume of acetonitrile is added, dropwise with stirring, 3.57 parts of methacrylyl chloride. The temperature is not allowed to exceed 30° C. Stirring is continued for 45 minutes, after which an equal volume of water is added to the reaction mixture causing the separation of a heavy oil. The water-acetonitrile layer is decanted and benzene is added causing the oil to crystallize. The solid is removed by filtration, air dried and recrystallized from carbon tetrachloride to yield 7.7 parts of N-perfluorooctanoyl-N'-methacryloyl-hydrazine melting at 111.5–113.5° C.

Analysis.—Calc'd for $C_{12}H_7F_{15}N_2O_2$: C, 29.04; H, 1.42. Found: C, 29.23; H, 1.41.

PROCEDURE B

N-perfluorooctanoyl-N'-methacryloylpiperazine (a) N-perfluorooctanoylpiperazine.—To a solution of 8.6 parts of anhydrous piperazine in 10 parts by volume of methanol is added, dropwise with stirring, 21.4 parts of methyl perfluorooctanoate. The reaction is exothermic to 29° and a heavy white precipitate separates. The precipitate is separated by filtration and shown by analysis to be N,N'-bis(perfluorooctanoyl)piperazine, M.P. 149–151° C. The filtrate is then taken to dryness by means of a rotary vacuum evaporator and the residue dissolved in 50 parts by volume of hot benzene. On cooling, 4.4 parts of a white precipitate is separated which is shown by analyses to be the di-perfluorooctanoic acid salt of piperazine, M.P. 248° dec. The filtrate is again taken to dryness by means of a rotary vacuum evaporator and the residue vacuum distilled. A fraction (3.75 parts) boiling at 107–8°/0.160 mm. is obtained which is shown by analysis to be the desired N-perfluorooctanoylpiperazine.

(b) N-perfluorooctanoyl-N'-methacryloylpiperazine.— To a cooled solution of 3.0 parts of N-perfluorooctanoyl-piperazine and 0.88 part of triethylamine in 5 parts by volume of acetonitrile is added, dropwise with mixing, 0.90 part of methacrylyl chloride. After standing for 1 hour at room temperature, 5 parts by volume of water is added to the reaction mixture causing the separation of an oil. The upper water layer is decanted and the oil washed two times with water whereupon the oil solidifies. The product is then filtered, dried and recrystallized from hot heptane. In this manner 1.9 parts of N-perfluoro-octanoyl-N'-methacryloylpiperazine, melting at 74–7° C., is obtained.

Analysis.—Calc'd for $C_{16}H_{13}F_{15}N_2O_2$: C, 34.92; H, 2.38. Found: C, 34.92; H, 2.45.

PROCEDURE C

N-perfluorooctanoyl-N'-methyl-N'-methacryloylhydrazine (a) N-perfluorooctanoyl-N'-methylhydrazine.—By the procedure of Procedure A (a), substituting an equimolar amount of methylhydrazine for the hydrazine hydrate, a crude solid product is isolated, which after drying, is purified by vacuum distillation. In this manner 16.6 parts of product boiling at 105.7°/2.4 mm. is obtained. The infrared spectrum shows the structure of this product to be N-perfluorooctanoyl-N'-methylhydrazine, rather than the other possible isomer, N-perfluorooctanoyl-N-methylhydrazine.

Analysis.—Calc'd for $C_9H_5F_{15}N_2O$: C, 24.45; H, 1.14. Found: C, 24.34; H, 0.86.

(b) By the procedure of Procedure I (b), substituting equimolar amounts of N-perfluorooctanoyl-N'-methylhydrazine for perfluorooctanoylhydrazide and triethylamine for pyridine, there is obtained a liquid product which is vacuum distilled to yield 7.2 parts of N-perfluoro-octanoyl-N'-methyl-N'-methacryloylhydrazine boiling at 147–150°/0.250 mm.

Analysis.—Calc'd for $C_{13}H_9F_{15}N_2O_2$: C, 30.60; H, 1.77. Found: C, 30.90; H, 1.90.

PROCEDURE D

N-perfluorooctanoyl-N'-acryloylhydrazine

To a 100 ml. flask containing 6.7 parts of perfluoro-octanoylhydrazide (Procedure A) and 1.74 parts of triethylamine in 40 parts by volume of acetonitrile is added dropwise with stirring 1.55 parts of acryloyl chloride. The temperature is kept between 20° C. and 28.5° C. by cooling. After the addition, stirring is continued for 2 hours at room temperature after which the reaction mixture is poured into water and the precipitated product separated by filtration, washed with water and dried to constant weight. The product is recrystallized from chloroform and then sublimed at 115° C. and 0.010 mm. pressure. In this manner 2.6 parts of N-perfluorooctanoyl-N'-acryloylhydrazine which melts at 115–116° C. is obtained. The structure of the product is confirmed by IR and NMR.

PROCEDURE E

N-perfluorooctanoyl-N'-methyl-N'-acryloylhydrazine

To a 200 ml. flask containing 23.6 parts of N-perfluoro-octanoyl-N'-methylhydrazine and 5.93 parts of triethylamine in 50 parts by volume of acetonitrile is added dropwise with stirring 5.28 parts of acryloyl chloride. The addition is carried out in 30 minutes and the temperature is not allowed to go above 30° C. After stirring at room temperature for 3 hours, the reaction mixture is poured into water. The oily layer is extracted into 1,1,2-trichloro-1,2,2-trifluoroethane, washed several times with water, dried and the solvent removed under reduced pressure. The viscous oil remaining is then distilled at reduced pressure whereupon 5.76 parts of N-perfluorooctanoyl-N'-acryloylhydrazine boiling at 126.5–138° C. at 0.005 mm. pressure is obtained. The structure of the product is confirmed by IR and NMR.

PROCEDURE F

N-perfluorooctanoyl-N,N'-dimethyl-N'-methacryloylhydrazine (a) N-perfluorooctanoyl-N,N'-dimethylhydrazide.—To a mixture of 10.0 parts sym-dimethylhydrazine dihydrochloride in 50 parts by volume of methanol is added 15.2 parts of triethylamine and 16.1 parts of methyl perfluoro-octanoate and the reaction mixture is refluxed for 2 hours.

The reaction mixture is then poured into water and the oily layer is extracted into ether. The ether extract is washed several times with water, dried and the ether removed under reduced pressure. The residue is distilled under reduced pressure to yield 5.8 parts of N-perfluorooctanoyl-N,N'-dimethylhydrazide boiling at 85–7° C. at 0.200 mm. pressure.

*Analysis.*—Calc'd for $C_{10}H_7F_{15}N_2O$: C, 26.33; H, 1.54; F, 62.48. Found: C, 26.47; H, 1.35; F, 62.61.

(b) N-perfluorooctanoyl-N,N'-dimethyl-N'-methacryloylhydrazine.—To a mixture of 5.8 parts of N-perfluorooctanoyl-N,N'-dimethylhydrazide and 1.53 parts of triethylamine in 20 parts by volume of acetonitrile is added 1.58 parts of methacryloyl chloride dropwise with stirring in 20 minutes, keeping the reaction temperature below 30° C. The reaction mixture is allowed to stand at room temperature for about 48 hours and then poured into water. The oily layer is extracted into methylene chloride, washed several times with water, dried and the solvent removed under reduced pressure. The residue is distilled at 0.4 mm. pressure to give 2.7 parts of N-perfluorooctanoyl - N,N'-dimethyl-N'-methacryloylhydrazine boiling at 128–134.5° C. The structure is confirmed by IR and NMR.

PROCEDURE G

By the procedure of Procedure A, substituting stoichiometrically equivalent amounts of appropriately substituted N-amino- and N-aminoalkyl perfluoroalkanoylamides and acrylyl halides, there are obtained the following new compounds of this invention:

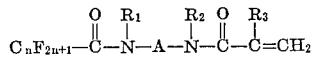

and by the AATCC-Water-Spray Test, respectively. The following repellency ratings are obtained:

Fabrics:
    Cotton—
        3-M-Oil Test _____ 90
        AATCC-Water-Spray Test _____ 70
    Wool—
        3-M-Oil Test _____ 90
        AATCC-Water-Spray Test _____ 70

The AATCC-Water-Spray Test rating is determined according to Standard Test Method 22–1966 of the American Association of Textile Chemists and Colorists, XXXVII, 1961, p. 1952 (also designated ASTM–D 583–58). Oil repellency is measured by the 3-M-Oil Test procedure of Grajek and Petersen, Textile Research Journal, April 1962, p. 323.

EXAMPLE II

Copolymers of N-perfluorooctanoyl-N'-methacryloyl hydrazine and n-laurylmethacrylate Copolymers of N - perfluorooctanoyl-N'-methacryloyl hydrazine and n-laurylmethacrylate are prepared as follows: 10 parts by weight of the monomer mixture and 0.2 part of azobisisobutyronitrile are dissolved in 30 parts of a mixture of ethylacetate and hexafluoroxylene (2:1). The solutions are sealed under nitrogen and polymerized for 16 hours at 80° C. Then the ampul is opened, the viscous polymer solution is diluted with 30 parts of trifluorotoluene and precipitated into 1200 parts of methanol. The dried copolymer is analyzed by C and H analysis and it is found that the copolymer composition is within ±2% of the limits of the composition of the

| $C_nF_{2n+1}$ | A | $R_1$ | $R_2$ | $R_3$ |
|---|---|---|---|---|
| $CF_3$ | | H | H | $CH_3$ |
| $(CF_3)_2CF$ | | $CH_3$ | H | H |
| $CF_3(CF_2)_6$ | $-(CH_2)_4-$ | H | $(CH_3)_2CH$ | $CH_3$ |
| $CF_3(CF_2)_{16}$ | $-(CH_2)_2-$ | | | $CH_3$ |
| $CF_3(CF_2)_{17}$ | | | $-(CH_2)_2-$ | H |
| $CF_3(CF_2)_6$ | | H | $CH_3$ | $CH_3$ |
| $CF_3(CF_2)_6$ | | $(CH_3)_3C$ | $(CH_3)_3C$ | $CH_3$ |
| $CF_3(CF_2)_{10}$ | | $CH_3(CH_2)_5$ | $CH_3(CH_2)_5$ | $CH_3$ |
| $CF_3(CF_2)_{10}$ | $-(CH_2)_2-$ | $CH_3CH_2$ | $CH_3CH_2$ | H |
| $CF_3(CF_2)_6$ | | $CH_3$ | $CH_3$ | H |
| $(CF_3)_2CF(CF_2)_6$ | | H | H | $CH_3$ |
| $(CF_3)_2CF[CF_2CF(CF_3)]_4$ | | H | H | $CH_3$ |
| $CF_3[CF_2CF(CF_3)]_5$ | | H | H | $CH_3$ |

The following examples are illustrative of the polymers of the instant invention. They are provided for the purposes of exemplification and are not to be construed to limit the scope of the claims in any manner.

EXAMPLE I

Poly (N - perfluorooctanoyl-N'-methacryloylhydrazine), alternative nomenclature, poly(N perfluorooctanoyl-aminomethacrylamide)

N-perfluorooctanoyl - N' - methacryloylhydrazine (prepared by Procedure A), 10 g., and 0.2 g. of azobisisobutyronitrile are dissolved in 20 g. of ethyl acetate and 10 g. of hexafluoroxylene and the solution is sealed in an ampul under nitrogen. After polymerizing at 80° C. for 15 hours, the ampul is opened and the polymer solution is diluted with 30 g. of benzotrifluoride and precipitated by pouring the polymer solution dropwise, with vigorous stirring into 800 ml. of methanol. The product is collected by filtration and is dried. The white, brittle polymer with a second order transition temperature (Tg) of 113° C. and a melting point of 158° C. is dissolved in a mixture of benzotrifluoride, hexafluoroxylene, ethyl acetate (1:1:1) to provide a 2% concentration by weight and the solution is applied to cotton and to wool fabrics. With 2% by weight of the polymer on the fabric, the oil- and water-repellency are evaluated by the 3-M-Oil test monomer mixture. 2% by weight of the copolymers, from a 2% solution, in ethylacetate and benzotrifluoride (1:1), is applied to cotton and wool as described in Example I and the following repellency ratings are obtained:

| Copolymer Composition | | | Repellency Ratings | |
|---|---|---|---|---|
| N-perfluorooctanoyl-N'-methacryloyl hydrazine, percent | Methacrylate, percent | Fabric | 3-M-Oil Test | AATCC-Water-Spray Test |
| 90 | 10 | Cotton | 90 | 70 |
| | | Wool | 90 | 70 |
| 77.4 | 22.6 | Cotton | 70–80 | 70 |
| | | Wool | 70–80 | 70 |
| 60 | 40 | Cotton | 60–70 | 70 |
| | | Wool | 60–70 | 60 |
| 36.7 | 63.3 | Cotton | 60 | 60 |
| | | Wool | 60 | 60 |

EXAMPLE III

Reactive copolymer of N-perfluorooctanoyl-N'-methacryloylhydrazine and blends thereof N-perfluorooctanoyl-N'-methacryloyl hydrazine, 8.8 g.; n-octylmethacrylate, 1 g.; glycidyl methacrylate, 0.2 g.; azobisisobutyronitrile 0.2 g. and n-lauryl mercaptan, 0.1 g., are dissolved in 10 g. of ethyl acetate and the solution is sealed in an ampul under nitrogen. After polymerizing for 20 hours at 70° C., the ampul is opened and the precipitated polymer is dissolved in 30 g. of a mixture of trifluorotoluene and ethyl acetate (1:2) and precipitated under stirring into 1000 ml. of hexane. The precipitated polymer is dried and a 2% solution in trifluorotoluene-ethyl acetate (1:2) is prepared. Then a 2% solution of a copolymer of 98% n-octylmethacrylate and 2% 2-hydroxypropyl methacrylate in the same solvent mixture is prepared. From these two polymer solutions, physical blends with different ratios are prepared and 0.04% of p-toluenesulfonic acid is added. Then the polymer solutions are applied to cotton and wool, dried and cured for 2 minutes at 350° F. and then evaluated as described in Example I. The following repellency ratings are obtained.

| Copolymer Blends | | | Repellency Ratings | |
| --- | --- | --- | --- | --- |
| Percent by wt. of fluorocopolymer | Percent by wt. of octyl-methacrylate copolymer | Fabric [1] | 3-M-Oil test | AATCC-Water-Spray Test |
| 100 |  | Cotton | 80 | 70 |
|  |  | Wool | 80 | 70 |
| 60 | 40 | Cotton | 80 | 70 |
|  |  | Wool | 80 | 70 |
| 40 | 60 | Cotton | 70 | 70 |
|  |  | Wool | 70 | 70 |
| 20 | 80 | Cotton | 60 | 70 |
|  |  | Wool | 70 | 70 |
| 10 | 90 | Cotton | 60 | 70 |
|  |  | Wool | 70 | 70 |

[1] 2% of the polymer blend on all fabric samples.

EXAMPLE IV

Reactive copolymers of N-perfluorooctanoyl-N'-methacryloylhydrazine and blends thereof As described in Example III, reactive copolymers of N-perfluorooctanoyl-N'-methacryloylhydrazine and of n-octylmethacrylate are prepared, but instead of glycidyl methacrylate and 2-hydroxy-propylmethacrylate, the following reactive acrylates and methacrylates are used:

acrylic acid
methacrylic acid
acrylamide
methacrylamide
N-methylol acrylamide
2-hydroxyethyl methacrylate
3-hydroxypropyl acrylate Both identical and different reactive acrylates or methacrylates are used in the fluorocopolymer and extender copolymer (non-fluorine-containing copolymer). Oil- and water-repellency results are substantially the same as those described in Example III.

EXAMPLE V

Homopolymerization of N-perfluorooctanoyl N,N'-dimethyl-N'-methacryloyl hydrazine N,N-dimethyl-N - perfluorooctanoyl - N'-methacryloylhydrazine, 13.5 g., and 0.35 g. of di-tert.-butylperoxide are sealed in an ampul under nitrogen. After polymerizing at 120° C. for 16 hours, the ampul is opened and the viscous solution is diluted with 300 ml. of hexane. After standing overnight, a residue separates from the hexane solution. After drying, 1.9 g. of a low-molecular weight homopolymer is obtained. When applied to cotton and wool from a 2% solution in ethyl acetate, the following repellency ratings were obtained:

Fabrics:
   cotton—
      3-M-Oil test _____ 80
      AATCC-Water-Spray test _____ 60
   wool—
      3-M-Oil test _____ 70
      AATCC-Water-Spray test _____ 70

EXAMPLE VI

Homopolymerization of N-perfluorooctanoyl-N'-methyl-N'-acryloylhydrazine

N-perfluorooctanoyl-N'-methyl - N'-acryloylhydrazine, 10 g.; azobisisobutyronitrile, 0.2 g.; and n-lauryl mercaptan, 0.1 g., are dissolved in 20 g. of hexafluoroxylene and sealed under nitrogen in an ampul. After polymerizing for 17 hours at 70° C. the ampul is opened and the highly viscous solution is diluted with 30 g. of hexafluoroxylene and precipitated, with stirring into 1200 ml. of methanol. The precipitated polymer is dried and a 2% solution of the polymer in hexafluoroxylene is applied to cotton and wool and evaluated as described in Example I. The following repellencies are obtained.

Fabrics:
   Cotton—
      3-M-oil test _____ 85
      AATCC-water-spray test _____ 70
   Wool—
      3-M-oil test _____ 90
      AATCC-water-spray test _____ 80

The free surface energy ($\gamma c$) of a polymer film is 14 dynes/cm.

EXAMPLE VII

Homopolymerization of N-perfluoro-N'-acryloylhydrazine

N-perfluoro-N'-acryloylhydrazine, 10 g.; azobisisobutyronitrile 0.2 g. and n-lauryl mercaptan, 0.2 g., are dissolved in 30 g. of a mixture of hexafluoroxylene-ethyl acetate (2:1) and sealed under nitrogen in an ampul. After polymerizing for 17 hours at 70° C. the ampul is opened and the precipitated polymer is dissolved in 90 g. of hexafluoroxylene. This polymer solution is added dropwise to 1000 ml. of methanol under vigorous stirring and the precipitated homopolymer is filtered and dried. The homopolymer has a melting point of about 205° C. A 2% solution of the polymer in hexafluoroxylene is applied to cotton and to wool and the repellency is evaluated as described in Example I. The following repellencies are obtained.

Fabrics:
   Cotton—
      3-M-oil test _____ 100
      ATTCC-water-spray test _____ 80
   Wool—
      3-M-oil test _____ 100
      AATCC-water-spray test _____ 80

EXAMPLE VIII

Homopolymerization of N-perfluorooctanoyl-N'-methacryloylpiperazine

N-perfluorooctanoyl-N'-methacryloylpiperazine, 10 g., and di-tert.butylperoxide, 0.2 g., are sealed in an ampul under nitrogen and polymerized for 18 hours at 120° C. The ampul is opened and the polymer dissolved in 50 g. of trifluorotoluene. The polymer solution is added dropwise to 1000 ml. of methanol under vigorous stirring and the precipitated polymer is filtered and dried. The polymer has a second order transition temperature (Tg-value) of 115° C. and melts at 140° C. as determined by differential thermal analysis. A 2% solution of this polymer in trifluorotoluene was applied to cotton and wool and evaluated as described in Example I. The following repellency ratings were obtained:

Fabrics:
   Cotton—
      3-M-oil test _____ 70
      AATCC-water-spray test _____ 70
   Wool—
      3-M-oil test _____ 70
      AATCC-water-spray test _____ 70

A polymer film shows a free surface energy ($\gamma c$) of 18 dynes/cm.

EXAMPLE IX

Copolymers with soil repellent properties are obtained by bulk or solution techniques according to the procedure of Examples I and VIII or, where appropriate, by emulsion polymerization using an ammonium persulfate catalyst and sodium perfluorooctanoate as emulsifier and N-pentadecafluorooctanoyl - N' - methacryloylhydrazine, with one third part by weight based on the said hydrazine, of the following comonomers:

ethylene
vinyl acetate
vinyl chloride
vinyl fluoride
vinyl chloroacetate
acrylonitrile
vinylidene cyanide
styrene
vinyl toluene
p-chlorostyrene
methyl acrylate
methyl methacrylate
α-chloroacrylic acid
methacrylonitrile
acrylamide
methacrylamide
vinyl carbazole
vinyl pyrrolidone
vinyl pyridene
methyl vinyl ether
methyl vinyl ketone
butadiene
chloroprene
fluoroprene and
isoprene Fabrics coated or sized with 2% by weight of these copolymers have enhanced oil- and water-repellency.

What is claimed is:

1. A polymer having a skeletal chain comprising repeating units of the structure represented by the formula:

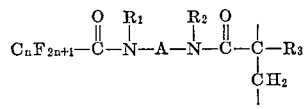

wherein:
$n$ is a whole number of from 1 to 18;
A is $—(CH_2)_m$, $m$ being from 0 to 4;
$R_1$ and $R_2$, independently, are each hydrogen or alkyl of from 1 to 6 carbon atoms; or when taken together $R_1$ and $R_2$ are $—CH_2CH_2—$ when A is $—CH_2CH_2—$; and
$R_3$ is hydrogen or methyl.

2. A polymer as defined in claim 1 wherein, in said compound, $n$ is 7, $m$ is 0, $R_1$ and $R_2$ are hydrogen and $R_3$ is methyl.

3. A polymer as defined in claim 1 wherein, in said compound, $n$ is 7, $m$ is 0, and $R_1$, $R_2$ and $R_3$ are methyl.

4. A polymer as defined in claim 1 wherein, in said compound, $n$ is 7, $m$ is 0, $R_1$ and $R_3$ are hydrogen, and $R_2$ is methyl.

5. A polymer as defined in claim 1 wherein, in said compound, $n$ is 7, $m$ is 0, and $R_1$, $R_2$ and $R_3$ are hydrogen.

6. A polymer as defined in claim 1 wherein $n$ is 7, $m$ is 2, $R_1$ and $R_2$, taken together, and A are $—CH_2CH_2—$ and $R_3$ is methyl.

7. A polymer as claimed in claim 1 which is a copolymer having repeating units of the structure defined in claim 1, and a comonomer containing an ethylenic linkage.

8. A polymer as claimed in claim 1 which is a copolymer having repeating units of the structure defined in claim 1 wherein $n$ is 7, $m$ is 0, $R_1$ and $R_2$ are hydrogen and $R_3$ is methyl and as the comonomer, n-laurylmethacrylate.

9. A polymer as claimed in claim 1 which is a copolymer having repeating units of the structure defined in claim 1 wherein $n$ is 7, $m$ is 0, $R_1$ and $R_2$ are hydrogen and $R_3$ is methyl and as a first comonomer, n-octyl methacrylate, and as a second comonomer, glycidyl methacrylate.

10. A composition of matter comprising a blend of a copolymer having repeating units of the structure as defined in claim 1 wherein $n$ is 7, $m$ is 0, $R_1$ and $R_2$ are hydrogen and $R_3$ is methyl, a comonomer of n-octyl methacrylate, and a comonomer of glycidyl methacrylate, and a copolymer of n-octyl methacrylate and 2-hydroxypropyl methacrylate.

11. A polymer having a skeletal chain consisting essentially of repeating units of the structure represented by the formula:

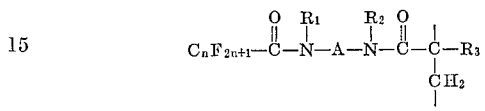

wherein:
$n$ is a whole number of from 1 to 18;
A is $—(CH_2)_m$, $m$ being from 0 to 4;
$R_1$ and $R_2$, independently, are each hydrogen or alkyl of from 1 to 6 carbon atoms; or when taken together $R_1$ and $R_2$ are $—CH_2CH_2—$ when A is $—CH_2CH_2—$; and
$R_3$ is hydrogen or methyl.

12. Fabrics which have been coated with the polymers as defined in claim 1 so as to have been rendered both water repellent and oil repellent.

13. Fabrics which have been coated with the polymer as defined in claim 2 so as to have been rendered both water repellent and oil repellent.

14. Fabrics which have been coated with the polymer as defined in claim 3 so as to have been rendered both water repellent and oil repellent.

15. Fabrics which have been coated with the polymer as defined in claim 5 so as to have been rendered both water repellent and oil repellent.

16. Fabrics which have been coated with the polymer as defined in claim 5 so as to have been rendered both water repellent and oil repellent.

17. Fabrics which have been coated with the polymer as defined in claim 6 so as to have been rendered both water repellent and oil repellent.

18. Fabrics which have been coated with the copolymers as defined in claim 7 so as to have been rendered both water repellent and oil repellent.

19. Fabrics which have been coated with the copolymer as defined in claim 8 so as to have been rendered both water repellent and oil repellent.

20. Fabrics which have been coated with the copolymer as defined in claim 9 so as to have been rendered both water repellent and oil repellent.

21. Fabrics which have been coated with the composition as defined in claim 10 so as to have been rendered both water repellent and oil repellent.

References Cited

UNITED STATES PATENTS

| | | | |
|---|---|---|---|
| 2,764,602 | 9/1956 | Ahlbrecht | 260—404.5 |
| 2,764,603 | 9/1956 | Ahlbrecht | 260—404.5 |
| 2,966,481 | 12/1960 | Brace | 260—561 |
| 3,134,810 | 5/1064 | Tomcufcik et al. | 260—561 |
| 3,185,539 | 5/1965 | Madison et al. | 260—561 |
| 3,256,231 | 6/1966 | Johnson et al. | 260—900 |

SAMUEL H. BLECH, *Primary Examiner.*

J. W. SNOW, *Assistant Examiner.*

U.S. Cl. X.R.

117—132, 135.5, 147, 152; 260—29.6, 33.8, 32.8, 31.2, 63, 80.3, 82.1, 86.1, 80.72, 88.3, 88.1, 85.7, 87.5, 85.5, 86.1, 268, 561, 404.5, 80.6, 80.75, 89.7, 900